United States Patent
Gallup (10) Patent No.: US 6,375,907 B1
(45) Date of Patent: Apr. 23, 2002

(54) HYDROGEN SULFIDE ABATEMENT WITH SCALE CONTROL AND/OR WELL ACIDIZING

(75) Inventor: Darrell L. Gallup, Santa Rosa, CA (US)

(73) Assignee: Union Oil Company of California, El Segundo, CA (US)

( * ) Notice: Subject to any disclaimer, the term of this patent is extended or adjusted under 35 U.S.C. 154(b) by 0 days.

(21) Appl. No.: 09/185,447

(22) Filed: Nov. 3, 1998

(51) Int. Cl.[7] ............................................. C01G 43/00
(52) U.S. Cl. ...................... 423/DIG. 19; 422/4; 422/8; 210/696; 75/712; 423/DIG. 19; 423/573.1; 423/224; 423/226; 423/242.2; 60/641.5; 96/155
(58) Field of Search .......................... 75/712; 210/696; 422/4, 8; 423/571, 572, 573.1, DIG. 19, 242.2; 60/641.5; 96/155, 224, 226

(56) References Cited

U.S. PATENT DOCUMENTS

| | | | | |
|---|---|---|---|---|
| 4,500,434 A | * | 2/1985 | Jost et al. .................... | 210/696 |
| 4,537,684 A | | 8/1985 | Gallup et al. ................ | 210/696 |
| 4,710,305 A | | 12/1987 | Allison et al. ............... | 210/747 |

(List continued on next page.)

FOREIGN PATENT DOCUMENTS

| WO | WO9706875 | 2/1997 |
|---|---|---|

OTHER PUBLICATIONS

D. P. Hoyer, K. R. Kitz and D. L. Gallup, "Salton Sea Unit 2: Innovations and Successes," *Geothermal Science & Technology*, vol. 5, 1997, pp. 155–169.

D. L. Gallup, "Brine pH Modification Scale Control Technology," *Geothermal Resources Council Transactions*, vol. 20, Sep./Oct. 1996, pp. 749–755.

D. L. Gallup, "BIOX Hydrogen Sulfide Abatement Process—Application Analysis," *Geothermal Resources Council Transactions*, vol. 20, Sep./Oct. 1996, pp. 11–17.

D. Hoyer, K. Kitz and D. Gallup, "Salton Sea Unit 2 Innovations and Successes," *Geothermal Resources Council Transactions*, vol. 15, Oct. 1991, pp. 355–361.

D.L. Gallup, "Iron Silicate Scale Formation and Inhibition at the Salton Sea Geothermal Field," *Geothermics*, vol. 18, No. 1/2, 1989, pp. 97–103.

D.P. Hoyer, K.R. Kitz and D.L. Gallup, "Salton Sea Unit 2: Innovations and Successes," *Geothermal Science & Technology*, vol. 5, 1997, pp 155–169.

D. L. Gallup, "Brine pH Modification Scale Control Technology," *Geothermal Resources Council Transactions*, vol. 20, Sep./Oct. 1996, pp. 749–755.

D. L. Gallup, "'BIOX' Hydrogen Sulfide Abatement Process—Application Analysis, " *Geothermal Resources Council Transactions*, vol. 20, Sep./Oct. 1996, pp. 11–17.

D. Hoyer, K. Kitz, and D. Gallup "Salton Sea Unit 2 Innovations and Successes," *Geothermal Resources Council Transactions*, vol. 15, Oct. 1991, pp. 355–361.

D. L. Gallup, "Iron Silicate Scale Formation and Inhibition at the Salton Sea Geothermal Field," *Geothermics*, vol. 18, No. 1/2, 1989 pp. 97–103.

Primary Examiner—Robert J. Warden, Sr.
Assistant Examiner—Imad Soubra
(74) Attorney, Agent, or Firm—Yale S. Finkle; Gregory F. Wirzbicki (57) ABSTRACT

The emissions of hydrogen sulfide during the production of natural gas, oil or geothermal fluids from subterranean formations and the subsequent processing of these fluids is reduced by converting the hydrogen sulfide into a hydrogen halide or a halogen acid and then using the hydrogen halide or halogen acid for scale control and/or well acidizing. In a preferred embodiment, hydrogen sulfide produced with geothermal fluids is converted into hydrochloric acid, which is then used to reduce pH and control scale formation during the extraction of energy from geothermal fluids in a geothermal power plant.

46 Claims, 1 Drawing Sheet

U.S. PATENT DOCUMENTS

| | | |
|---|---|---|
| 5,028,340 A | 7/1991 | Gallup ........................ 210/753 |
| 5,061,373 A | 10/1991 | Gallup ........................ 210/697 |
| 5,082,892 A * | 1/1992 | Gallup et al. .................. 75/712 |
| 5,085,782 A | 2/1992 | Gallup et al. ............... 210/696 |
| 5,167,834 A * | 12/1992 | Gallup ........................ 210/747 |
| 5,190,664 A | 3/1993 | Gallup et al. ............... 210/696 |
| 5,656,172 A | 8/1997 | Kitz et al. .................. 210/696 |

\* cited by examiner

HYDROGEN SULFIDE ABATEMENT WITH SCALE CONTROL AND/OR WELL ACIDIZING

BACKGROUND OF INVENTION

This invention relates generally to processes or methods for abating the emissions of hydrogen sulfide during the production of hydrogen sulfide-containing fluids from a subterranean reservoir and the subsequent processing of such fluids. The invention is particularly concerned with abating hydrogen sulfide emissions by converting hydrogen sulfide removed from the subterranean reservoir into an acid which is then used to control scale formation and/or to acidize production or injection wells. More particularly, the invention is concerned with controlling hydrogen sulfide emissions while inhibiting scale formation during the production of energy from a hydrogen sulfide-containing geothermal fluid, such as geothermal brine.

In many areas of the world where oil, gas and geothermal fluids are produced from underground reservoirs for subsequent use as energy sources, significant amounts of hydrogen sulfide, in some cases as much as 2.0 weight percent, are also removed with these fluids. Typically, hydrogen sulfide emissions must be abated in order to comply with environmental regulations. The methods used to achieve such abatement are quite frequently expensive and add significantly to the costs of producing and processing the oil, gas or geothermal fluids. This is especially true for processes in which geothermal fluids are removed from underground reservoirs and processed to generate electric power.

In general, processes by which geothermal brine is used to generate electric power have been known for some time. Geothermal brine from a producing well can be flashed to a reduced pressure to convert some of the water in the brine into steam. Steam produced in this manner is generally used in conventional steam turbine-type power generators to produce electricity. The remaining geothermal brine still contains significant energy, which can be captured by flashing the brine again for use in a steam turbine or by passing the brine through a closed-loop, binary fluid system in which a low-boiling point, secondary liquid (such as a hydrocarbon) is vaporized by the hot brine, and the resultant vapor used in a separate turbine-generator to produce electricity. Regardless of whether the brine is used for additional power generation, the geothermal brine is most commonly reinjected into the ground through a "reinjection well" for one or more reasons, such as replenishing the aquifer from which the brine was extracted and preventing ground subsidence.

Geothermal brines generally contain a high concentration of noncondensable gases, such as hydrogen sulfide, carbon dioxide, ammonia, and the like. In many localities such gases, particularly hydrogen sulfide, must be abated to comply with environmental restrictions. The use of hydrogen-sulfide abatement methods, such as the Selectox process, the LoCat process, and the methods described in U.S. Pat. Nos. 5,028,340 and 5,061,373, the disclosures of which patents are incorporated herein by reference in their entireties, can be quite expensive.

Geothermal brines also contain a high concentration of dissolved solid components, such as silica, metal sulfides and calcium carbonates. The solubility of most dissolved solid components in geothermal brine decreases with a decrease in brine temperature. Consequently, when a significant reduction in the brine temperature occurs or a loss of water due to a secondary flash takes place, supersaturation and precipitation of a portion of these components can result. Precipitates can deposit as a scale on any solid surface with which the brine comes into contact, such as a vessel, pipeline, or well in which the brine is confined. Scaling of the rock formation in the vicinity of the wellbore is also a well-documented occurrence.

High enthalpy brines, i.e., brines having an in-situ temperature above about 425° F., typically have larger concentrations of dissolved solids than low enthalpy brines. The removal of larger amounts of heat and steam therefore produce significant levels of super-saturation and faster precipitation kinetics. These brines therefore tend to produce copious quantities of scale which can foul or plug conduits, heat-exchangers, vessels, injection wells, and/or the subterranean formation in the vicinity of the immediate reinjection wells.

It has been taught that strong acids, such as sulfuric acid and hydrochloric acid, can be added to highly saline brines in order to control scaling. Examples of such teachings can be found in U.S. Pat. Nos. 4,500,434 and 5,190,664, the disclosures of which are incorporated herein by reference in their entireties. Unfortunately, the use of such acids adds expense to the overall process of producing energy from geothermal fluids. Moreover, the transportation of the strong acids over public roads to the site of the geothermal power plant, which is frequently located in relatively remote regions of the world, increases the risk of accidental spill, injury and property damage.

Although, as discussed above, strong acids have been used to control scale formation, especially in processes where energy is extracted from geothermal fluids, and techniques currently exist for abating hydrogen sulfide emissions during the production of oil, gas and geothermal fluids, a need exists for more cost effective ways of abating hydrogen sulfide emissions and at the same time controlling scaling.

SUMMARY OF THE INVENTION

In accordance with the invention, it has now been found that the emissions of hydrogen sulfide during the production of oil, gas and/or geothermal fluids from subterranean reservoirs can be substantially avoided and/or significantly reduced by separating the hydrogen sulfide from produced fluids and converting the separated hydrogen sulfide into a hydrogen halide gas. The conversion is typically carried out by reacting the hydrogen sulfide with a halogen gas in a gas phase reactor or by contacting the hydrogen sulfide with halogen-containing solids, such as inorganic hypochlorites, chloroisocyanates, and bromochlorohydantoins. In order to make the hydrogen sulfide abatement process more cost effective, the hydrogen halide can be used, either directly or after it has been dissolved in water to form the corresponding halogen acid, to acidize the formation from which the oil, gas or geothermal fluids are withdrawn or to acidize production and reinjection wells in the same general vicinity. The hydrogen halide or halogen acid can also be used to control scaling in water produced from oil and gas reservoirs, or in processes for extracting energy from the produced geothermal fluids.

The on-site production of a hydrogen halide or a halogen acid from hydrogen sulfide removed from underground reservoirs with the oil, gas or geothermal fluids not only avoids the economic disadvantage of transporting considerable quantities of acid over great distances to remotely located facilities in order to utilize the acid for well acidizing or scale control, but also results in hydrogen sulfide abatement and thereby eliminates the cost ordinarily associated with conventional means of controlling such emissions. Moreover, the on-site production eliminates the potential environmental and safety hazards of transporting the acid over long distances on public roads in remote areas of the world.

A preferred embodiment of the invention involves the extraction of energy from a produced geothermal brine or fluid. In this embodiment, the geothermal fluid removed from an underground reservoir is flashed to produce hydrogen sulfide-containing steam and a geothermal brine containing dissolved solids. The steam is then used in a turbine generator to produce electricity. The hydrogen sulfide-containing steam exiting the turbine is condensed to produce a substantially moisture-free hydrogen sulfide which is then contacted with chlorine- or bromine-containing solids to produce hydrogen chloride or hydrogen bromide. These acid gases are then scrubbed to produce either hydrochloric acid or hydrobromic acid. The produced acid is added to the geothermal brine to reduce its pH, thereby preventing solids from precipitating to form scale during processing of the brine to remove its heat energy. The acid-treated brine also tends to remove previously formed scale. The site-produced acid, for example, can be added (1) directly into the production well to acidize the well and/or prevent scaling during removal of geothermal fluids from the reservoir, (2) upstream of the flash vessel to prevent scaling in the flash vessel during steam separation, or (3) in the piping upstream or downstream of the heat exchanger used to extract energy from the brine. In addition, the acid can be used to acidify reinjection wells or other producing wells in the same general vicinity in order to increase injectivity or geothermal fluid production, respectively. This integrated process results in the simultaneous abatement of hydrogen sulfide and inhibition of scale formation during the energy recovery process and results in a more cost effective overall operation.

DETAILED DESCRIPTION OF THE INVENTION

Figure 1:
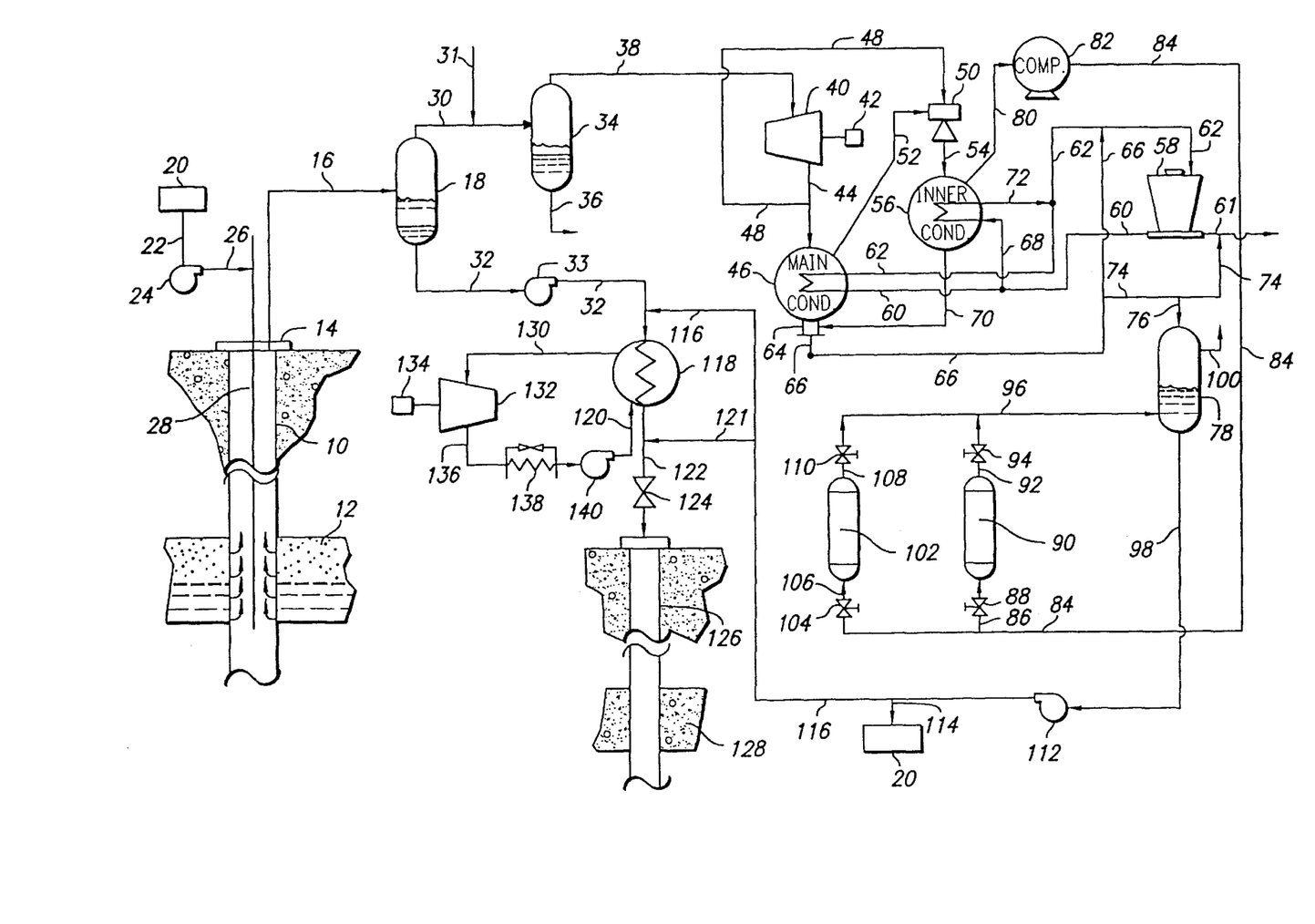
The drawing is a schematic flow diagram of a geothermal power plant and its associated production and reinjection wells in which an embodiment of the invention is used to reduce hydrogen sulfide emissions and control scale formation during the production of geothermal fluids and their processing to extract energy and generate electrical power.

The drawing shows a geothermal power plant in which geothermal fluids are removed from a production well and processed to produce steam and hot brine which are then used to generate electricity. The process depicted in the drawing is a preferred embodiment of the process of the invention in which hydrogen sulfide emissions are substantially reduced by converting hydrogen sulfide produced with the geothermal fluids into a halogen acid which is used to control scaling in the piping and equipment of the power plant. It will be understood that the process of the invention is not limited to use in geothermal power plants but can be used in any situation in which it is desired to abate hydrogen sulfide emissions while producing a hydrogen halide or halogen acid useful for scale control in aqueous systems or for well acidizing. For example, the process of the invention may be used in conjunction with the production of oil and gas as will be described in more detail hereinafter.

It should be noted that the drawing is a simplified process flow diagram and therefore does not show many types of equipment, such as heat exchangers, valves, separators, heaters, compressors, etc., not essential for understanding the invention by one skilled in the relevant art.

In the process depicted in the drawing, a high temperature and high pressure mixture of steam, noncondensable gases, e.g., hydrogen sulfide and carbon dioxide, and brine is removed from geothermal reservoir 12 through production or extraction well 10 and wellhead 14 and passed via line 16 into flash vessel 18. In some cases it may be desirable to pass the two phase mixture in line 16 through a dual phase turbine (not shown in the drawing) to generate electricity prior to introducing the mixture into flash vessel 18. Typically, the produced fluids contain between about 10 ppmw and 1,000 ppmw hydrogen sulfide, which must ordinarily be abated during processing of the fluids in order to comply with environmental regulations.

In producing and utilizing the hot pressurized fluids, a portion of the dissolved components, particularly silicon-containing components, metal sulfides and carbonate salts, at or near their saturation concentration can precipitate and deposit scale in the production well, in the surrounding formation, and in processing equipment used in the power plant. Silicon-containing components in the brine include silicic acid, oligomers of silicic acid, and silicates. The carbonate-forming components include calcium, strontium and barium cations, carbonate and bicarbonate anions, and carbon dioxide derived components. Metal sulfide components include lead sulfide, iron sulfide, zinc sulfide, copper sulfide, and the like. All of these components are capable of precipitation and can form scale containing metal silicates, polymers of crystalline or amorphous silicas, metal sulfides, and/or carbonate or carbonate-related products. In the process of the invention, these components are kept in solution by lowering the pH of the produced brine by introducing either a hydrogen halide gas or a halogen acid into the brine in sufficient quantities to lower the pH between about 0.1 and 5.0 pH units, preferably between 0.3 and 4.0 pH units, more preferably between 0.5 and 3.5 pH units, and more preferably yet between 1.0 and 3.0 pH units.

In the embodiment of the invention shown in the drawing, a halogen acid, preferably hydrochloric acid or hydrobromic acid, in portable tank 20 is pumped via conduit 22, pump 24 and conduit 26 into a coiled tubing injection line 28, which carries the acid down well 10 to a location which is preferably below the point where any scaling may begin and may be actually in the reservoir or formation itself. Since the portion of injection line 28 extending below wellhead 14 is exposed to the high temperature environment of the geothermal fluid being produced, it is preferred that the conduit carrying the acid to pump 24 from the portable tank and especially injection line 28 be made of corrosion resistant metal, for example, stainless steel, Hastelloy, Inconel, or the like.

The pH of the brine as it enters production well 10 from geothermal reservoir 12 is typically about 4 to about 7, usually between about 5 and 6. The temperature of the brine can vary considerably from well to well but is usually in the range from about 250° F. to about 600° F., typically between about 425° F. and 575° F. Normally, production well 10 is produced by allowing the brine to boil in the reservoir or somewhere within the length of the production well to produce a self-propelled mixture of steam, gas, and brine at the wellhead 14. In some instances, the use of a wellhead pump, not shown in the drawing, may be preferred depending on characteristics of the reservoir, the chemistry of the brine and other considerations.

The geothermal fluids brought to the surface in production well 10, which fluids include hot geothermal brine containing dissolved solid components including silica, noncondensable gases, and steam, are introduced under pressure, usually between about 200 and 1,000 psig, via conduit 16 into flash vessel or separator 18. Here, the brine is flashed to a substantially lower pressure, such as between 50 and 200 psig, to release more steam. The noncondensable gases including hydrogen sulfide and carbon dioxide are separated or stripped from the geothermal brine and removed overhead of the flash vessel through line 30 while the brine is removed from the bottom of the flash vessel through conduit 32.

The steam and noncondensable gases removed overhead of flash vessel 18 through line 30 are mixed with water introduced into line 30 through line 31 and the resultant mixture is passed into steam scrubber 34.

Here the water injected into line 30, which water dissolves chloride and other impurities from the steam, and any residual brine are separated from the steam and noncondensable gases and removed through conduit 36. The remaining brine-free and chloride-free steam and gasses are discharged overhead of scrubber 34 through conduit 38 and passed into steam turbine 40 which drives generator 42 to produce electricity. The steam condensate produced in the turbine, steam and noncondensable gases exit the turbine through line 44 and are passed into main condenser 46. A small slip stream of steam and noncondensable gases is diverted from conduit 44 through line 48 to steam eductor 50, which is powered by noncondensable gases removed from the main condenser through line 52, and then through line 54 into second or inner condenser 56.

In main condenser 46, which is preferably a shell and tube heat exchanger, the steam and noncondensable gases including hydrogen sulfide exiting turbine 40 are placed in indirect heat exchange with cooled condensate from open, cascade-type, condensate cooling tower 58, which cooled condensate is passed by means of a pump (not shown in the drawing) from the sump region of the cooling tower through line 60 into the main condenser 46. Sufficient heat is transferred from the steam and noncondensable gases in the main condenser to the cooled condensate such that the steam is condensed and the temperature of the cooled condensate is increased, usually by between 10° F. and 50° F. The heated condensate is removed from the main condenser through line 62 and returned to cooling tower 58 for cooling before reuse.

The steam condensate produced in main condenser 46 is passed from the condenser through outlet region 64 into conduit 66. Additional steam condensate produced in inner condenser 56 by indirect heat exchange between the steam and noncondensable gases introduced into the condenser through line 54 and the water from cooling tower 58 introduced into the inner condenser via conduits 60 and 68 is removed from the condenser through line 70 and mixed with steam condensate from the main condenser 46 in outlet region 64. The water passed into the inner condenser through line 68 is increased in temperature by indirect heat exchange with the steam and noncondensable gases, and the resultant heated water is removed from the inner condenser through line 72 and passed into line 62 for return to cooling tower 58.

At least a portion of the steam condensate from main condenser 46 and inner condenser 56, which is combined in outlet region 64 of the main condenser, is passed through conduit 66 into conduit 62 for use as makeup water to cooling tower 58. The remainder of the condensate is removed from conduit 66 through conduit 74 and passed through conduit 76 into scrubber 78.

Over time, the concentration of salts in the cooling tower water increases to a level that may cause corrosion. To avoid such a buildup of salts, a small portion of the circulating condensate (normally referred to as blowdown) is removed, either periodically or continuously, from the cooling tower through line 61 and disposed of, usually via a reinjection well. Depending on the situation, this blowdown stream may be mixed prior to disposal with any condensate in line 74 that is not passed into scrubber 78.

Noncondensable gases including hydrogen sulfide and carbon dioxide are discharged from the main condenser 46 through conduit 52 into eductor 50 where they are mixed with the steam and noncondensable gases in line 48 and then passed through conduit 54 into inner condenser 56. Here, additional steam is condensed from the gases to produce a substantially dry mixture of noncondensable gases which are removed from the inner condenser through line 80. These gases contain a substantial amount of hydrogen sulfide, normally between about 10,000 ppmw and about 100,000 ppmw and more usually between about 20,000 and 50,000 ppmw. Since most geothermal power operations are required to control air pollution as part of their operating permits, abatement of the hydrogen sulfide emissions from the power plants is critical to continued operations. The hydrogen sulfide in line 80 can be removed by utilizing the Selectox process, the Locat process, or other processes which convert hydrogen sulfide to elemental sulfur. However, utilizing such processes adds considerably to the cost of the electricity generated in the power plant.

It has now been found that the extraction of energy from geothermal fluids in a geothermal power plant can be made more economical by converting the hydrogen sulfide in the off gases from the condensers into a hydrogen halide gas and using that hydrogen halide directly, or after conversion into its corresponding halogen acid, to lower the pH of the salt-containing brine, either as it is produced in production well 10 or elsewhere in the brine handling portion of the power plant, to keep the salts and other solids in solution and thereby control or inhibit scaling. By simultaneously abating hydrogen sulfide emissions and controlling scaling in this manner, the economics of the overall power production process are greatly improved.

In the process of the invention, hydrogen sulfide is normally converted into either hydrogen chloride or hydrogen bromide; however, hydrogen iodide or hydrogen fluoride can be produced if desired. Also, although the hydrogen halide gas can be used directly to acidify brine either in the production well 10 or during brine processing in the power plant, it is preferred that the hydrogen halide be dissolved in water to produce the corresponding halogen acid which is then used as the pH modifier. Thus, it is normally preferred to convert the hydrogen sulfide into hydrochloric acid or hydrobromic acid.

The conversion of the hydrogen sulfide in the noncondensable gases removed from inner condenser 56 through line 80 into a hydrogen halide can be accomplished in several ways depending on which hydrogen halide is desired. For example, the hydrogen sulfide can be converted into hydrogen fluoride, hydrogen chloride or hydrogen bromide by reacting the hydrogen sulfide, respectively, with fluorine gas, chlorine gas or bromine gas in a gas reactor or chamber in accordance with procedures well known in the art. Alternatively, the hydrogen sulfide can be converted into hydrogen bromide or hydrogen iodide by passing the hydrogen sulfide upward through columns of liquid containing bromine in solution or iodine in suspension, respectively. However, the preferred method of converting the hydrogen sulfide into a hydrogen halide is to pass the hydrogen sulfide gas through one or more beds of solids containing the desirable halogen, as is described in more detail hereinafter.

Referring again to the drawing, the noncondensable gases, primarily hydrogen sulfide and carbon dioxide, are passed by compressor 82 through conduit 84, line 86 and valve 88 into conversion vessel 90 wherein the gases are directed upwardly in contact with a packed bed of halogen-containing solids. During contact with the solids, hydrogen sulfide is oxidized to sulfur, the halogen atoms in the halogen-containing solids are reduced from the plus to the minus state, and the reduced halogen atoms combine with hydrogen atoms from the hydrogen sulfide to form a hydrogen halide. The carbon dioxide normally passes through the solids without reacting with them and exits the conversion vessel with the hydrogen halide generated therein. Although the halogen-containing solids are usually present in vessel 90 in the form of a packed bed, it will be understood that the solids could be used in the vessel as a fluidized bed.

Preferably, the solids in conversion vessel 90 contain chlorine and/or bromine and can be either inorganic or organic compounds. Preferred inorganic compounds include inorganic hypochlorites such as calcium hydrochlorite. Organic compounds that can be used in the conversion vessel normally include those compounds containing at least one haloimine group, i.e., a group where N is a nitrogen atom and x is a halogen atom. Examples of such compounds are the oxidizing agents described in detail in U.S. Pat. No. 5,028,340, the disclosure of which is incorporated herein by reference in its entirety. Particularly preferred organic compounds include chloroisocyanates, chlorohydantions, and bromochlorohydantions. Specific chlorine-containing solids that may be used in conversion vessel 90 include lithium hypochlorite, calcium hypochlorite, trichloroisocyanuric acid, salts of trichloroisocyanuric acid, 1-bromo-3-chloro-5,5-dimethylhydantoin, 1,3-dichlorohydantoin, 1,3-dichloro-5,5-dimethylhydantoin, 3-chloro-4,4-dimethyl-2-oxazolidinone and chloroazodin. Examples of bromine-containing solids that can be used to convert the hydrogen sulfide into hydrogen bromide include 1,3-dibromohydantoin, 1-bromo-3-chloro-5,5-dimethylhydantoin, and dibromocyanoacetamide.

In order to ensure that the halogen-containing solids in conversion vessel 90 do not disintegrate when contacting the hydrogen sulfide-containing noncondensable gases passing upward through the vessel, it is normally desired that the noncondensable gases be substantially free of moisture in the form of water and steam. Typically, the noncondensable gases contain less than 10 weight percent moisture, normally less than 5 weight percent, preferably less than 1 weight percent, and most preferably are substantially moisture free. In order to achieve these low levels of moisture, it may be necessary to pass the noncondensable gases through additional condensers. For example, if the noncondensable gases exiting inner condenser 56 through line 80 contain more than 10 weight percent moisture, the gases should be passed through at least one after-condenser in order to condense additional steam and thereby further reduce the moisture content of the gases.

Normally, the contacting of the hydrogen sulfide-containing noncondensable gases with the halogen-containing solids in vessel 90 is carried out in the substantial absence of a liquid phase at a temperature between about 75° F. and about 150° F. and at a pressure between about 1.0 psig and about 30 psig. The temperature of the contacting will typically range between about 80° F. and about 120° F., usually between about 90° F. and about 110° F. The residence time of the noncondensable gases in the conversion vessel is sufficient to achieve substantially complete conversion of hydrogen sulfide into a hydrogen halide and other reaction products.

A mixture of hydrogen halide gas and carbon dioxide, which mixture normally contains less than 1,000 ppmw hydrogen sulfide, is withdrawn overhead from conversion vessel 90 through line 92 and valve 94 and passed through conduit 96 into scrubber 78. Here the mixture of hydrogen halide gas and carbon dioxide is passed upwardly in contact with downward flowing steam condensate passed into the top of scrubber 78 through line 76, thereby forming a dilute solution of halogen acid which is removed from the scrubber through line 98. Undissolved hydrogen chloride, carbon dioxide and trace amounts of hydrogen sulfide then exit the scrubber through line 100. Typically, this gas will contain hydrogen sulfide and hydrogen chloride in separate concentrations of less than about 1,000 ppmw, usually less than 100 ppmw and more usually less than 50 ppmw, and can normally be passed directly into the atmosphere without violating environmental regulations. When the solids in vessel 90 contain chlorine, a dilute hydrochloric acid solution containing less than about 3 weight percent hydrogen chloride is removed through line 98 and is relatively easy to handle in plastic drums or tanks for use elsewhere in the process for scale control as will be discussed in more detail hereinafter.

At some point in time, the halogen-containing solids in conversion vessel 90 will become spent and will contain substantial amounts of elemental sulfur deposited therein when the hydrogen sulfide reacts with the halogen-containing solids in the vessel. The deposited sulfur will also increase the pressure drop through the vessel and make it more difficult to pass the hydrogen sulfide-containing noncondensable gases upward through the solids. When this occurs, the noncondensable gases in line 84 are diverted to a second conversion vessel 102 containing a fresh bed of the halogen-containing solids. This is accomplished by closing valve 88 and passing the noncondensable gases through line 84, valve 104 and line 106 into conversion vessel 102. Here the hydrogen sulfide and carbon dioxide are passed upward through a fresh bed of halogen-containing solids so that the hydrogen sulfide can react with the solids to produce the corresponding hydrogen halide. The hydrogen halide and carbon dioxide mixture is then removed overhead from vessel 102 through line 108 and valve 110 and passed through line 96 to scrubber 78.

Once the flow of noncondensable gases is bypassed around conversion vessel 90, via lines 84 and 106 and valve 104, to conversion vessel 102, valve 94 in outlet line 92 from conversion vessel 90 can be closed to isolate the vessel from the system and allow the spent halogen-containing solids to be removed from the vessel and replaced with fresh solids for use when the solids in vessel 102 become spent.

The site-produced halogen acid removed from scrubber 78 through conduit 98 is passed by pump 112 through line 114 into portable tank 20, which can then be transported to wellhead 14 where the acid is injected down well 10 via line 22, pump 24, line 26 and coiled tubing 28. Here, the halogen acid lowers the pH of the produced geothermal fluids, thereby keeping silica and other components in solution and preventing the formation of scale as the fluids flow upward through the well.

Although the injection of the acid directly downhole into geothermal reservoir 12 lowers the pH of the geothermal brine at its origin, the pH increases as the brine is produced and passes through the power plant. For example, as steam and noncondensable gases are removed overhead of flash vessel 18 through line 30, the pH of the brine removed through line 32 increases. Thus, it may also be desirable to inject the site-produced halogen acid into the brine at places in the overall process where substantial amounts of scale containing silicates, metal sulfides and/or calcium or other carbonates may form. For example, the acid may be injected into the geothermal fluids in line 16 upstream of flash vessel 18, into the brine exiting flash vessel 18 through line 32, or into the brine exiting heat exchanger 118 through line 122. If the latter two injection points are used, the site produced acid is passed either via pump 112 through line 116 into line 32 or via pump 112 through lines 116 and 121 into line 122 as shown in the drawing.

The brine removed from flash vessel 18 through line 32 usually contains sufficient heat energy that it can be used to generate power in a secondary heat recovery process. The hot brine, after it has been mixed with any halogen acid introduced into line 32 via line 116, is passed by pump 33 into shell and tube heat exchanger 118 at a temperature normally ranging between about 212° F. and 575° F. and a pressure between about 130 psig and 1,000 psig. In the heat exchanger, the brine is passed through the tubes in indirect heat exchange with a binary fluid introduced into the shell side of the heat exchanger through line 120. The binary fluid extracts heat from the brine, and the cooled brine, normally at a temperature between about 150° F. and about 300° F., exits the heat exchanger through line 22 and is introduced through valve 124 into reinjection well 126 and ultimately into subterranean reservoir 128.

The binary or working fluid introduced into heat exchanger 118 through line 120 is normally a hydrocarbon liquid such as pentane or isobutane. The liquid is heated by indirect heat exchange with the brine to a temperature sufficient to vaporize the liquid. The vapors are then passed through line 130 to turbine 132 which drives generator 134 to produce additional electricity in the power plant. The vaporized fluid exiting turbine 132 is passed through line 136 and condensed in condenser 138 before being passed by pump 140 through line 120 back into heat exchanger 118.

As previously mentioned, the pH modifier, whether it be the halogen acid produced in scrubber 78 or its corresponding hydrogen halide gas produced in conversion vessels 90 and/or 102, is used to lower the pH of geothermal fluids from which energy is extracted in the process depicted in the drawing or similar processes in order to inhibit scale formation and to remove previously formed scale. This can be accomplished by injecting the pH modifier into the geothermal fluids that exist at any particular point in the process. For example, the pH modifier can be introduced into the production well 10, into the two phase fluid, i.e., steam and brine, in line 16 upstream of the flash vessel 18, into the brine exiting the flash vessel, into the brine exiting heat exchanger 118, and/or into reinjection well 126. Normally, the pH of the fluids prior to injection of the pH modifier will range from 5.0 to 10, more usually between 5.5 and 8.5. Usually, a sufficient amount of the modifier is added at the desired location to lower the pH to below 7.0, 6.0 or 5.0. Typically, the modifier is added in quantities such that the pH is in the range from 4.0 to 6.0, preferably 5.0 to 6.0. Methods of controlling the amount of the added pH modifier are discussed in detail in U.S. Pat. No. 5,656,172, the disclosure of which is incorporated herein in its entirety.

In addition to using the halogen halide or halogen acid to reduce pH and control scaling in the energy extraction process depicted in the drawing, these acids can be used for well acidizing in order to increase the rate of production from either production well 10 or other production wells in the vicinity of the power plant. They can also be used to increase injectivity in injection well 126 or other injection wells in the same general vicinity. When used for such purposes, the acid is injected downwell into the production reservoir or the injection reservoir in amounts sufficient to increase production or injectivity, respectively.

In the process depicted in the drawing, hydrogen sulfide emissions from a geothermal power plant are reduced by converting the hydrogen sulfide into a halogen acid and then using the halogen acid to control scaling by lowering the pH of geothermal fluids at various locations within the energy extraction process taking place in the power plant. It will be understood that the invention is not limited to use in the process depicted in the drawing but is also applicable in other processes where there is a need to abate hydrogen sulfide emissions. For example, during the production of oil and gas, hydrogen sulfide-containing fluids are frequently withdrawn from subterranean reservoirs. In such situations and in accordance with the invention, the hydrogen sulfide can be converted into a hydrogen halide or halogen acid as described previously to abate hydrogen sulfide emissions. In addition, the resultant hydrogen halide or halogen acid can then be used to control scale formation and/or dissolve existing scale in equipment used to process the gas, oil and other fluids, such as water, removed from the subterranean reservoir. Alternatively, the halogen acid or hydrogen halide can be used to acidize the production well itself or other wells in the general vicinity of the production well in order to increase the flow of oil and/or gas.

The nature and objects of the invention are further illustrated by the following examples, which are provided for illustrative purposes only and not to limit the invention as defined by the claims. The examples illustrate that hydrogen sulfide can be converted to hydrogen chloride by contacting the hydrogen sulfide with chlorine-containing solids.

EXAMPLE 1

Hydrogen sulfide gas was generated by adding a 1 N solution of acetic acid dropwise to a flask containing sodium bisulfide. The hydrogen sulfide generated by the reaction of the acetic acid with the sodium bisulfide was then passed at ambient temperature through a bed of trichloroisocyanuric acid chips contained in a horizontal glass column. The reaction gases removed from the end of the glass column were bubbled through a column of water contained in a graduated cylinder. The pH of the water was then measured and the water was analyzed for chloride ions using the mercuric thiocyanate colorimetric method. The normality of the hydrochloric acid solution formed in the graduated cylinder was calculated based on the measured chloride concentration. Finally, a Dräger tube was used to measure the concentration of hydrogen sulfide in the off gas from the cylinder. The results of these tests are set forth below in Table 1.

TABLE 1

| Run No. | pH of Water | Concentration in Water Cl (ppmw) | Concentration in Water HCl (N) | Concentration of H$_2$S in Off Gas (ppmw) |
|---|---|---|---|---|
| Baseline | 7.55 | 0 | 0 | 0 |
| 1 | 1.45 | 1,400 | 0.04 ± 0.01 | 3 |
| 2 | 1.52 | 1,250 | 0.03 ± 0.01 | <3 |
| 3 | 1.75 | 590 | 0.02 ± 0.01 | <3 |
| 4 | 1.65 | 800 | 0.02 ± 0.01 | <3 |

The data in Table 1 show that the hydrogen sulfide reacts with the trichloroisocyanuric acid chips to form HCl which is then dissolved in water to form hydrochloric acid. The low concentration of hydrogen sulfide in the off gas from the graduated cylinder indicates that substantially all of the hydrogen sulfide fed to the glass column reacted with the trichloroisocyanuric acid chips. The reaction can be illustrated as follows:

$$3H_2S_{(g)} + C_3N_3O_3Cl_{3(s)} \longrightarrow 3S_{(s)} + 3HCl_{(g)} + C_3H_3N_3O_{3(s)}$$

EXAMPLE 2

The procedure of Example 1 was repeated except the hydrogen sulfide gas was passed through a horizontal glass column packed with calcium hypochlorite chips. In the only run conducted, the pH of the water was measured as 1.95, the concentrations of Cl and HCl in the water were, respectively, 400 ppmw and 0.01 N, and there was less than 3 ppmw H$_2$S in the off gas from the graduated cylinder. These numbers compare with the baseline case in which the water had a pH of 7.43 and contained no Cl or HCl. These data suggest that the following reaction occurs:

$$Ca(OCl)_{2(s)} + 2H_2S_{(g)} \longrightarrow CaO \cdot H_2O_{(s)} + 2S_{(s)} + 2HCl_{(g)}$$

Although this invention has been described in conjunction with examples and by reference to several embodiments of the invention, it is evident that many alterations, modifications and variations will be apparent to those skilled in the art in light of the foregoing description. Accordingly, it is intended to embrace within the invention all such alternatives, modifications and variations that fall within the spirit and scope of the appended claims.

What is claimed is:

1. A method for abating the emissions of hydrogen sulfide gas during the removal of a hydrogen sulfide-containing fluid from a subterranean reservoir which comprises:
   (a) separating hydrogen sulfide gas from said hydrogen sulfide-containing fluid; and
   (b) converting the separated hydrogen sulfide gas into a hydrogen halide gas in the presence of less than 1, weight percent of water.

2. The method of claim 1 further comprising the steps of dissolving said hydrogen halide gas in water to form a halogen acid and using said halogen acid to acidize a subterranean formation.

3. The method of claim 1 wherein said hydrogen sulfide-containing fluid is removed from said subterranean reservoir during the production of natural gas.

4. The method of claim 1 wherein said hydrogen sulfide-containing fluid is removed from said subterranean reservoir during the production of crude oil.

5. The method of claim 1 wherein said hydrogen sulfide-containing fluid is removed from said subterranean reservoir during the production of geothermal fluids.

6. The method of claim 1 wherein said separated hydrogen sulfide gas is converted into hydrogen chloride gas.

7. The method of claim 6 wherein said hydrogen sulfide gas is converted into hydrogen chloride gas by reacting the separated hydrogen sulfide gas with chlorine-containing solids in the presence of less than 1 weight percent of water.

8. The method of claim 7 wherein said chlorine-containing solids are selected from the group consisting of inorganic hypochlorites, chloroisocyanates, chlorohydantoins and bromochlorohydantions.

9. The method of claim 7 wherein said chlorine-containing solids are selected from the group consisting of lithium hypochlorite, calcium hypochlorite, trichloroisocyanuric acid, salts of trichloroisocyanuric acid, 1-bromo-3-chloro-5,5-dimethylhydantoin, 1,3-dichlorohydantoin, 1,3-dichloro-5,5-dimethylhydantoin, 3-chloro-4,4-dimethyl-2-oxazolidinone, and chloroazodin.

10. The method of claim 6 wherein, subsequent to its formation, said hydrogen chloride gas is dissolved in water to form hydrochloric acid.

11. The method of claim 1 further comprising the step of using said hydrogen halide gas to acidize a subterranean formation.

12. A method for inhibiting scale formation and/or removing previously formed scale while abating hydrogen sulfide gas emissions during the production of energy from a hydrogen sulfide-containing geothermal fluid, which method comprises introducing a halogen acid into said hydrogen sulfide-containing geothermal fluid, wherein said halogen acid is produced at least in part from hydrogen sulfide gas removed from said hydrogen sulfide-containing geothermal fluid by converting said hydrogen sulfide gas into a hydrogen halide gas in the presence of less than 1 weight percent of water and subsequently dissolving the hydrogen halide gas in water to form said halogen acid.

13. The method of claim 11 wherein said halogen acid is selected from the group consisting of hydrochloric acid, hydrobromic acid, hydroiodic acid, and hydrofluoric acid.

14. The method of claim 13 wherein hydrochloric acid is introduced into said hydrogen sulfide-containing geothermal fluid.

15. The method of claim 14 wherein said hydrochloric acid is produced by reacting at least a portion of the hydrogen sulfide gas removed from said hydrogen sulfide-containing geothermal fluid with chlorine-containing solids in the presence of less than 1 weight percent of water to make hydrogen chloride gas, and subsequently dissolving said hydrogen chloride gas in water.

16. The method of claim 15 wherein said chlorine-containing solids contain at least one $$-\underset{|}{N}-Cl$$

group.

17. The method of claim 15 wherein said chlorine-containing solids are selected from the group consisting of inorganic hypochlorites, chloroisocyanates, chlorohydantoins, and bromochlorohydantoins.

18. The method of claim 15 wherein said chlorine-containing solids are selected from the group consisting of lithium hypochlorite, calcium hypochlorite, trichloroisocyanuric acid, salts of trichloroisocyanuric acid, 1-bromo-3-chloro-5,5-dimethylhydantoin, 1,3-dichlorohydantoin, 1,3-dichloro-5,5-dimethylhydantoin, 3-chloro-4,4-dimethyl-2-oxazolidinone, and chloroazodin.

19. The method of claim 14 wherein said hydrochloric acid is produced by reacting hydrogen sulfide gas removed from said hydrogen sulfide-containing geothermal fluid with chlorine gas to make hydrogen chloride gas, and subsequently dissolving the hydrogen chloride gas in water.

20. The method of claim 12 wherein hydrobromic acid is introduced into said hydrogen sulfide-containing geothermal fluid.

21. The method of claim 20 wherein said hydrobromic acid is produced by reacting at least a portion of the hydrogen sulfide gas removed from said hydrogen sulfide-containing geothermal fluid with bromine-containing solids in the substantial absence of water to make hydrogen bromide gas, and subsequently dissolving said hydrogen bromide gas in water.

22. The method of claim 21 wherein said bromine-containing solids contain at least one —N—Br group.

23. The method of claim 21 wherein said bromine-containing solids are selected from the group consisting of 1,3-dibromohydantoin, 1-bromo-3-chloro-5,5-dimethylhydantoin, and dibromocyanoacetamide.

24. The method of claim 20 wherein said hydrobromic acid is produced by reacting hydrogen sulfide gas removed from said hydrogen sulfide-containing geothermal fluid with bromine gas to make hydrogen bromide gas, and subsequently dissolving the hydrogen bromide gas in water.

25. The method of claim 13 wherein said halogen acid is introduced into said hydrogen sulfide-containing geothermal fluid upstream of a flash vessel.

26. The method of claim 13 wherein said halogen acid is introduced into said hydrogen sulfide-containing geothermal fluid upstream of a dual phase turbine.

27. The method of claim 13 wherein said halogen acid is introduced into said hydrogen sulfide-containing geothermal fluid upstream of a heat exchanger.

28. The method of claim 13 wherein a sufficient amount of said halogen acid is introduced into said hydrogen sulfide-containing geothermal fluid to lower its pH by about 0.1 to about 5.0 pH units.

29. A method for inhibiting scale formation and/or removing previously formed scale during the production of energy from a hydrogen sulfide-containing geothermal fluid which comprises:

(a) introducing an acid selected from the group consisting of hydrochloric acid and hydrobromic acid into said geothermal fluid to form a resulting composition, wherein said hydrochloric acid is produced by reacting hydrogen sulfide gas removed from said hydrogen sulfide-containing geothermal fluid with chlorine-containing solids in the presence of less than 1 weight percent of moisture to make hydrogen chloride gas and then dissolving said hydrogen chloride gas in water, and wherein said hydrobromic acid is produced by reacting hydrogen sulfide gas removed from said hydrogen sulfide-containing geothermal fluid with bromine-containing solids in the presence of less than 1 weight percent of moisture to make hydrogen bromide gas and then dissolving said hydrogen bromide gas in water; and (b) extracting energy from said resulting composition.

30. The method of claim 29 wherein said acid is hydrochloric acid, said hydrogen sulfide gas is reacted with chlorine-containing solids in the presence of less than 1 weight percent of moisture, and said chlorine-containing solids are selected from the group consisting of lithium hypochlorite, calcium hypochlorite, trichloroiso-cyanuric acid, salts of trichloroisocyanuric acid, 1-bromo-3-chloro-5,5-dimethylhydantoin, 1,3-dichlorohydantoin, 1,3-dichloro-5,5-dimethylhydantoin, 3-chloro-4,4-dimethyl-2-oxazolidinone, and chloroazodin.

31. The method of claim 29 wherein said acid is hydrobromic acid, said hydrogen sulfide gas is reacted with bromine-containing solids in the presence of less than 1 weight percent of moisture, and said bromine-containing solids are selected from the group consisting of 1,3-dibromo-hydantoin, 1-bromo-3-chloro-5,5-dimethyl-hydantoin, and dibromocyanoacetamide.

32. The method of claim 29 wherein step (b) comprises the substeps of:

(b1) separating the resulting composition into a hydrogen sulfide-containing steam and a brine effluent; and (b2) extracting energy from said hydrogen sulfide-containing steam.

33. The method of claim 32 further comprising the step of extracting energy from said brine effluent.

34. The method of claim 29 wherein a sufficient amount of said acid is introduced into said hydrogen sulfide-containing geothermal fluid to lower its pH by about 1.0 to about 3.0 pH units.

35. A method for controlling scale formation during the production of energy from a hydrogen sulfide-containing geothermal fluid which comprises:

(a) separating said hydrogen sulfide-containing geothermal fluid into steam containing hydrogen sulfide gas and a brine effluent;

(b) removing at least a portion of the hydrogen sulfide gas from said hydrogen sulfide-containing steam;

(c) converting at least a portion of the hydrogen sulfide gas removed from said hydrogen sulfide-containing steam into hydrochloric acid by reacting said hydrogen sulfide gas with chlorine-containing solids in the presence of less than about 1.0 weight percent moisture to make hydrogen chloride gas and then dissolving the hydrogen chloride gas in water;

(d) introducing said hydrochloric acid into said brine effluent to form a resulting composition and;

(e) extracting energy from said resulting composition.

36. The method of claim 35 wherein step (a) is carried out by flashing said hydrogen sulfide-containing geothermal fluid.

37. The method of claim 35 wherein hydrogen sulfide gas is removed from said hydrogen sulfide-containing steam by passing the steam through one or more indirect contact condensers.

38. The method of claim 35 further comprising the step of extracting energy from said hydrogen sulfide-containing steam prior to step (b).

39. The method of claim 38 wherein energy is extracted from said hydrogen sulfide-containing steam by passing said steam through a steam turbine.

40. The method of claim 35 wherein said hydrochloric acid is introduced into said brine effluent up-stream of a heat exchanger.

41. The method of claim 35 wherein a sufficient amount of said hydrochloric acid is introduced into said brine effluent to lower its pH by about 0.5 to about 3.5 pH units.

42. A method for converting hydrogen sulfide gas into a hydrogen halide gas which comprises reacting said hydrogen sulfide gas with halogen-containing solids in the absence of a liquid phase.

43. The method of claim 42 wherein said hydrogen sulfide gas is converted into hydrogen chloride gas by reacting said hydrogen sulfide gas with chlorine-containing solids.

44. The method of claim 43 wherein said chlorine-containing solids are selected from the group consisting of lithium hypochlorite, calcium hypochlorite, trichloroisocyanuric acid, salts of trichloroisocyanuric acid, 1-bromo-3-chloro-5,5-dimethylhydantoin, 1,3-dichlorohydantoin, 1,3-dichloro-5,5-dimethylhydantoin, 3-chloro-4,4-dimethyl-2-oxazolidinone, and chloroazodin.

45. The method of claim 43 wherein said hydrogen sulfide gas is reacted with said chlorine-containing solids at a temperature between about 75° F. and 150° F.

46. The method of claim 42 wherein said hydrogen sulfide gas is converted into hydrogen bromide gas by reacting said hydrogen sulfide gas with bromine-containing solids.

* * * * *

UNITED STATES PATENT AND TRADEMARK OFFICE
CERTIFICATE OF CORRECTION

PATENT NO. : 6,375,907 B1
DATED : April 23, 2002
INVENTOR(S) : Darrell L. Gallup It is certified that error appears in the above-identified patent and that said Letters Patent is hereby corrected as shown below:

Column 12,
Line 41, cancel "claim 11" and insert in place thereof -- claim 12 --.

Column 13,
Line 11, cancel "claim 12" and insert in place thereof -- claim 13 --;
Line 18, cancel "substantial absence" and insert in place thereof -- presence of less than 1 weight percent --;
Line 22, cancel "—N—Br" and insert in place thereof  -- $\overset{|}{-N-Br}$ --.

Signed and Sealed this

Eighteenth Day of February, 2003

JAMES E. ROGAN
*Director of the United States Patent and Trademark Office*